(12) United States Patent
Shinoda et al.

(10) Patent No.: US 10,938,305 B2
(45) Date of Patent: Mar. 2, 2021

(54) ELECTRONIC CONTROL DEVICE, IN-VEHICLE SYSTEM, AND POWER SUPPLY DEVICE

(71) Applicant: Hitachi Automotive Systems, Ltd., Hitachinaka (JP)

(72) Inventors: Hiroshi Shinoda, Tokyo (JP); Ming Liu, Tokyo (JP); Hideyuki Sakamoto, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/760,136

(22) PCT Filed: Sep. 13, 2018

(86) PCT No.: PCT/JP2018/033927
§ 371 (c)(1),
(2) Date: Apr. 29, 2020

(87) PCT Pub. No.: WO2019/092982
PCT Pub. Date: May 16, 2019

(65) Prior Publication Data
US 2020/0254947 A1    Aug. 13, 2020

(30) Foreign Application Priority Data
Nov. 13, 2017    (JP) .............................. JP2017-218505

(51) Int. Cl.
*H02M 3/156*    (2006.01)
*B60W 60/00*    (2020.01)
(Continued)

(52) U.S. Cl.
CPC ............. *H02M 3/156* (2013.01); *B60R 16/03* (2013.01); *B60W 60/001* (2020.02);
(Continued)

(58) Field of Classification Search
CPC ....... B60R 16/02; H02M 3/155; H02M 3/158; H02M 2001/008; H02M 3/1584;
(Continued)

(56) References Cited

U.S. PATENT DOCUMENTS 9,484,817 B2 *  11/2016  Sakai ..................... H02M 3/157
10,523,106 B2 * 12/2019  Li .......................... H02M 1/088
(Continued)

FOREIGN PATENT DOCUMENTS

JP    63-245254 A    10/1988
JP    2003-259634 A    9/2003
(Continued)

OTHER PUBLICATIONS

International Search Report (PCT/ISA/210) issued in PCT Application No. PCT/JP2018/033927 dated Dec. 11, 2018 with English translation (four (4) pages).
(Continued)

Primary Examiner — Ryan Johnson
(74) Attorney, Agent, or Firm — Crowell & Moring LLP

(57) ABSTRACT

The present invention reduces conducted noise of an input current in a power supply device having a plurality of channels at low cost. In a power supply circuit (210) possessed by an autonomous running control ECU, switching circuits 22 respectively generate, on the basis of control signals C, power supplies supplied to a plurality of logic circuits. A transition management unit 25 controls the switching circuits 22. A clock generation unit 26 generates a plurality of clock signals. The transition management unit 25 has a control signal generation unit and a plurality of delay units. The control signal generation unit generates intermediate control signals from the clock signals generated by the clock generation unit 26. The delay units delay the intermediate control signals on the basis of command signals (Continued)

and output the delayed intermediate control signals as the control signals C. The clock signals generated by the clock generation unit include at least one clock signal having a different frequency.

15 Claims, 13 Drawing Sheets

(51) Int. Cl.
*B60R 16/03* (2006.01)
*H02M 3/157* (2006.01)
*H02M 3/158* (2006.01)
*H02M 1/00* (2006.01)

(52) U.S. Cl.
CPC ............ *H02M 3/157* (2013.01); *H02M 3/158* (2013.01); *H02M 3/1584* (2013.01); *H02M 2001/008* (2013.01)

(58) Field of Classification Search
CPC ......... H02M 2003/1586; H02M 3/157; H02M 1/14; H02M 3/156; G06F 1/26
See application file for complete search history.

(56) References Cited

U.S. PATENT DOCUMENTS

| | | |
|---|---|---|
| 2017/0085079 A1 | 3/2017 | Yamane |
| 2017/0244322 A1 | 8/2017 | Nakazawa |
| 2018/0278154 A1* | 9/2018 | Yamane .................. H02M 1/44 |

FOREIGN PATENT DOCUMENTS

| | | |
|---|---|---|
| JP | 2016-54581 A | 4/2016 |
| JP | 2017-153218 A | 8/2017 |
| WO | WO 2015/136746 A1 | 9/2015 |
| WO | WO 2016/080452 A1 | 5/2016 |

OTHER PUBLICATIONS

Japanese-language Written Opinion (PCT/ISA/237) issued in PCT Application No. PCT/JP2018/033927 dated Dec. 11, 2018 (four (4) pages).

* cited by examiner

[FIG. 1]
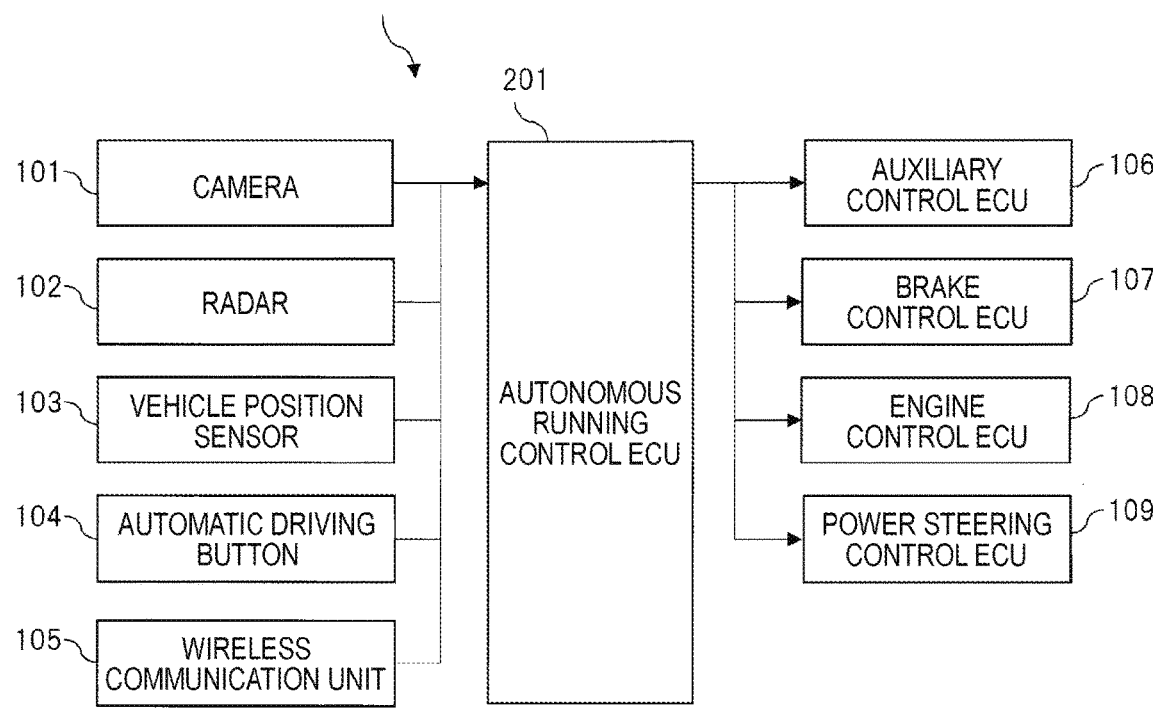

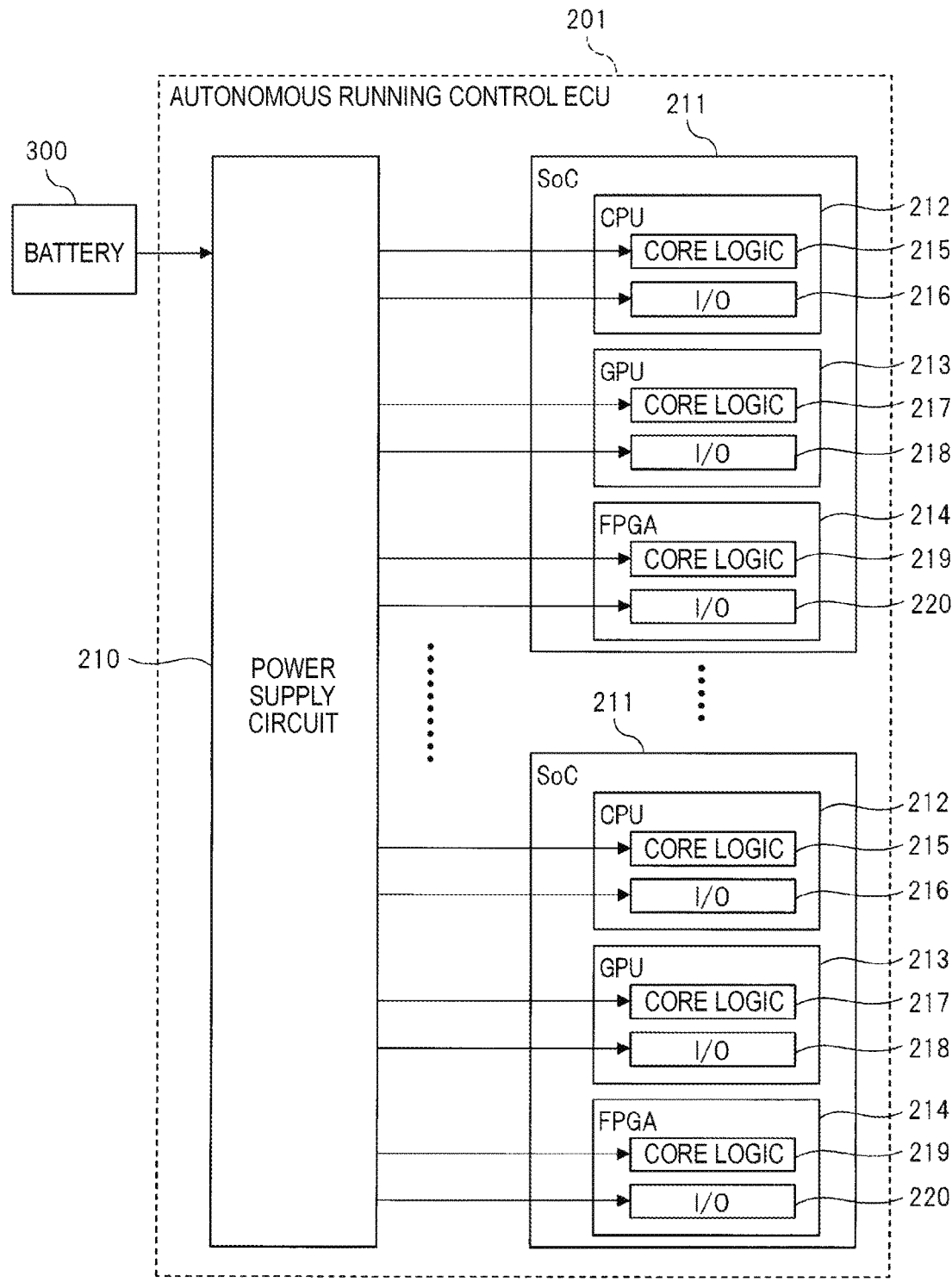
[FIG. 2]

[FIG. 3]
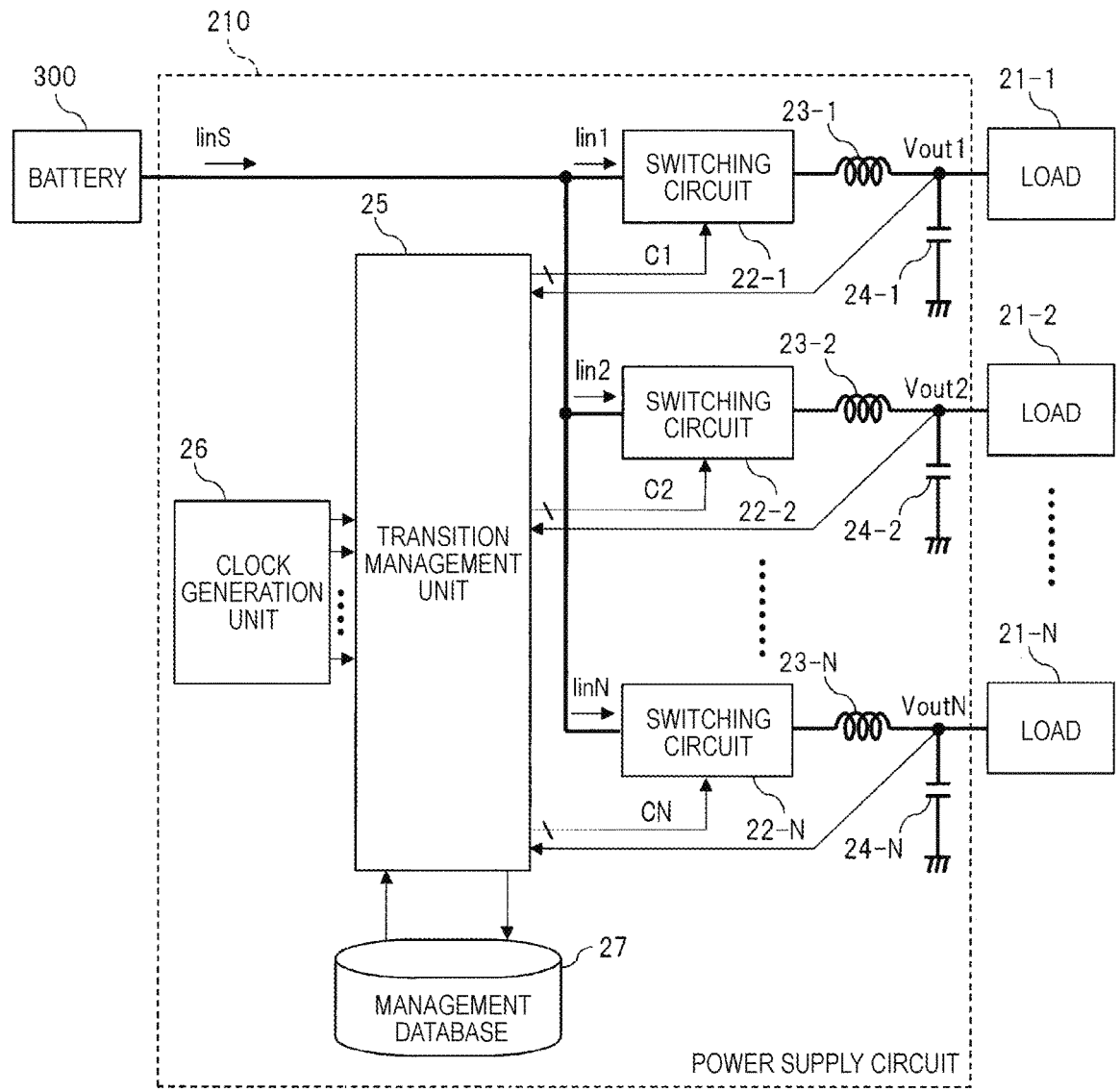

[FIG. 4]
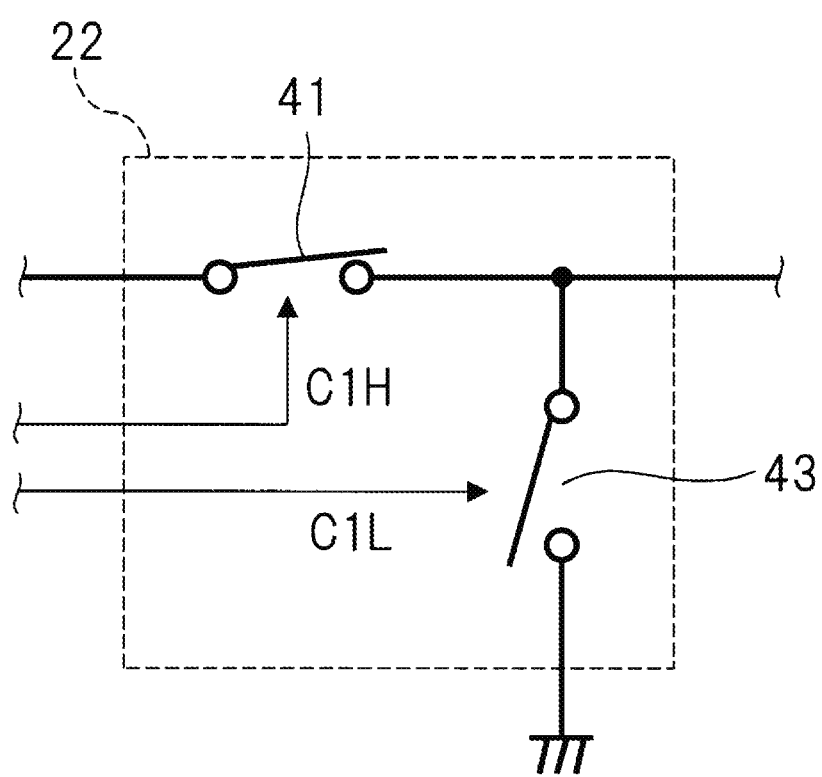

[FIG. 5]
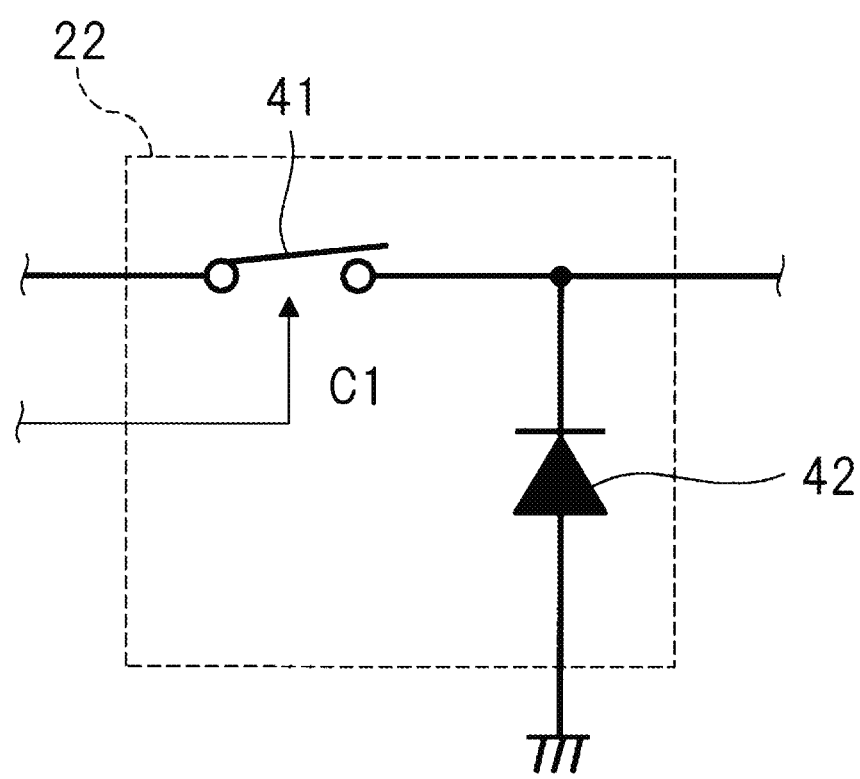

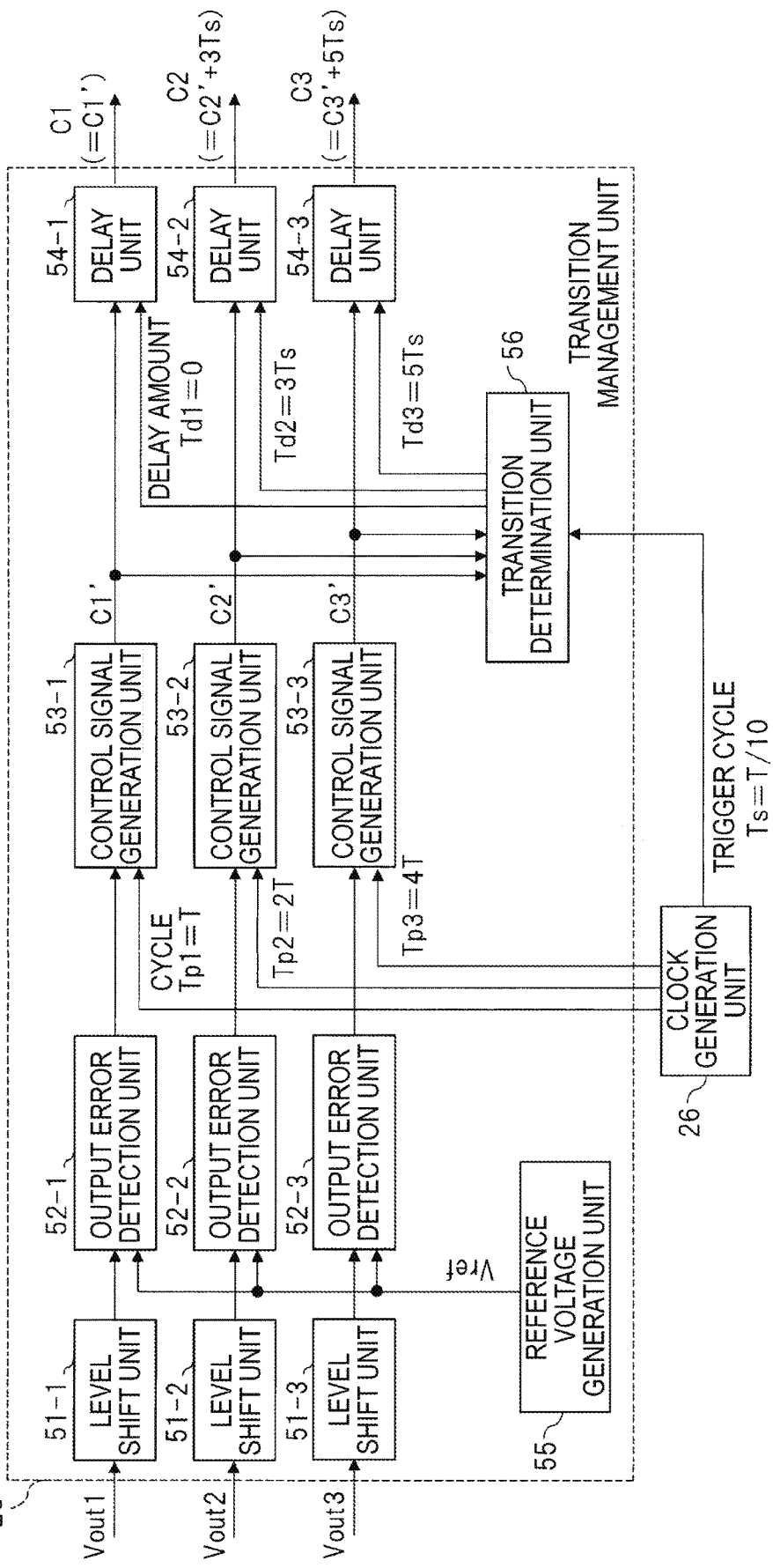

[FIG. 7]
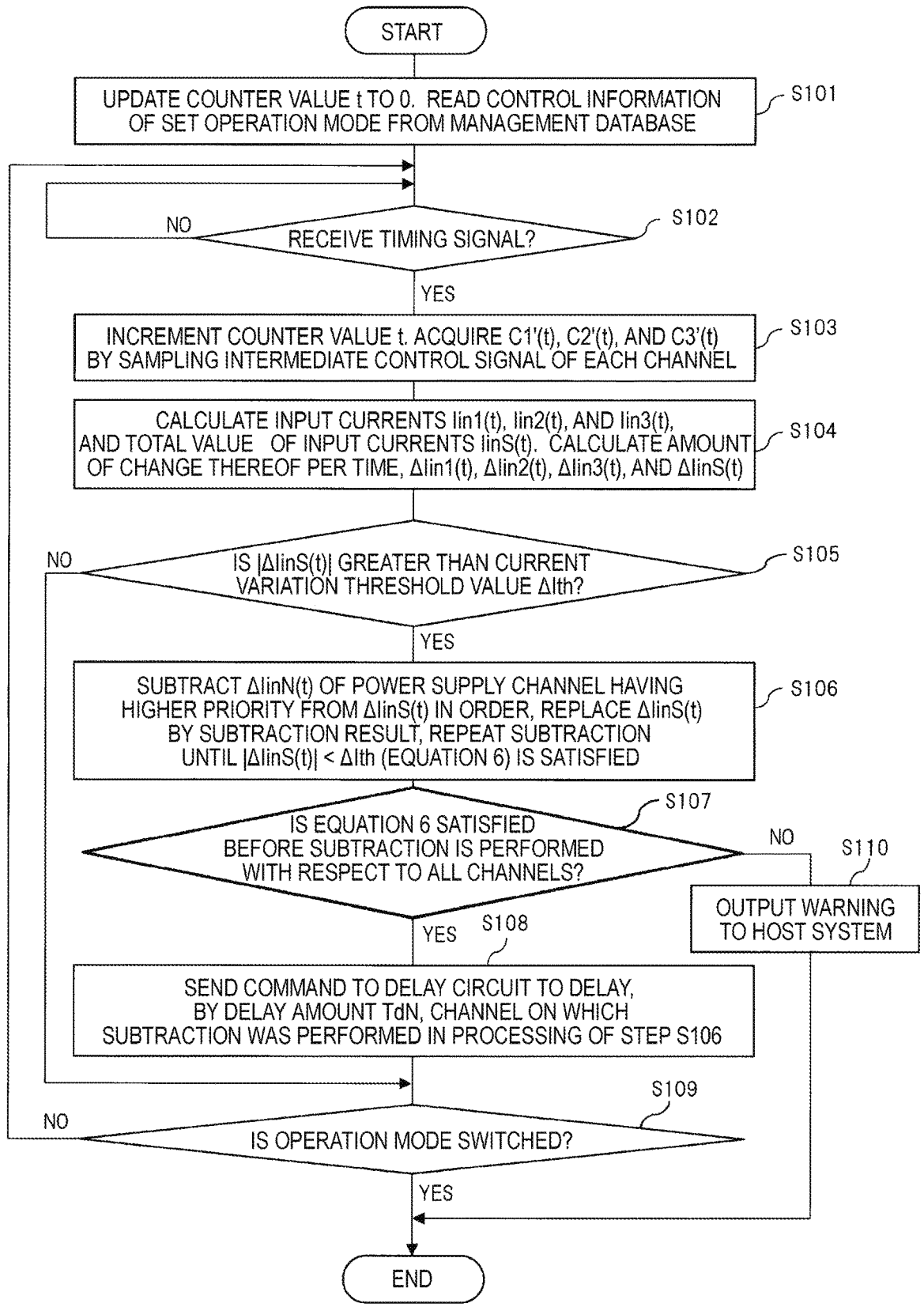

[FIG. 8]

| OPERATION MODE | CONTROL INFORMATION (DETECTION MODE) | CONTROL INFORMATION (TIME SPAN) | CONTROL INFORMATION (CURRENT VARIATION THRESHOLD VALUE) | CONTROL INFORMATION (CURRENT COEFFICIENT) | CONTROL INFORMATION (DELAY AMOUNT) | CONTROL INFORMATION (PRIORITY) |
|---|---|---|---|---|---|---|
| MODE A (CITY RUNNING) | DETECT INSTANTANEOUS VALUE & AVERAGE VALUE | $Ts=Ts\_a$ | $\Delta Ithpk = \Delta ithpk\_a$ $\Delta Ithav = \Delta Ithav\_a$ | $Im1=Im1a$ $Im2=Im2a$ $\vdots$ $ImN=ImNa$ | $Td1=Td1a$ $Td2=Td2a$ $\vdots$ $TdN=TdNa$ | $1<2<3<\cdots<N$ |
| MODE B (HIGHWAY RUNNING) | DETECT INSTANTANEOUS VALUE & AVERAGE VALUE | $Ts=Ts\_b$ | $\Delta Ithpk = \Delta Ithpk\_b$ $\Delta Ithav = \Delta Ithav\_b$ | $Im1=Im1b$ $Im2=Im2b$ $\vdots$ $ImN=ImNb$ | $Td1=Td1b$ $Td2=Td2b$ $\vdots$ $TdN=TdNb$ | $1<2<3<\cdots<N$ |
| MODE C (PARKING) | DETECT INSTANTANEOUS VALUE & AVERAGE VALUE | $Ts=Ts\_c$ | $\Delta Ithpk = \Delta Ithpk\_c$ $\Delta Ithav = \Delta Ithav\_c$ | $Im1=Im1c$ $Im2=Im2c$ $\vdots$ $ImN=ImNc$ | $Td1=Td1c$ $Td2=Td2c$ $\vdots$ $TdN=TdNc$ | $1<2<3<\cdots<N$ |
| MODE D (ECU ABNORMALITY) | DETECT INSTANTANEOUS VALUE ONLY | $Ts=Ts\_d$ | $\Delta Ithpk = \Delta Ithpk\_d$ | $Im1=Im1d$ $Im2=Im2d$ $\vdots$ $ImN=ImNd$ | $Td1=Td1d$ $Td2=Td2d$ $\vdots$ $TdN=TdNd$ | $1<2<3<\cdots<N$ |
| $\vdots$ | $\vdots$ | $\vdots$ | $\vdots$ | $\vdots$ | $\vdots$ | $\vdots$ |

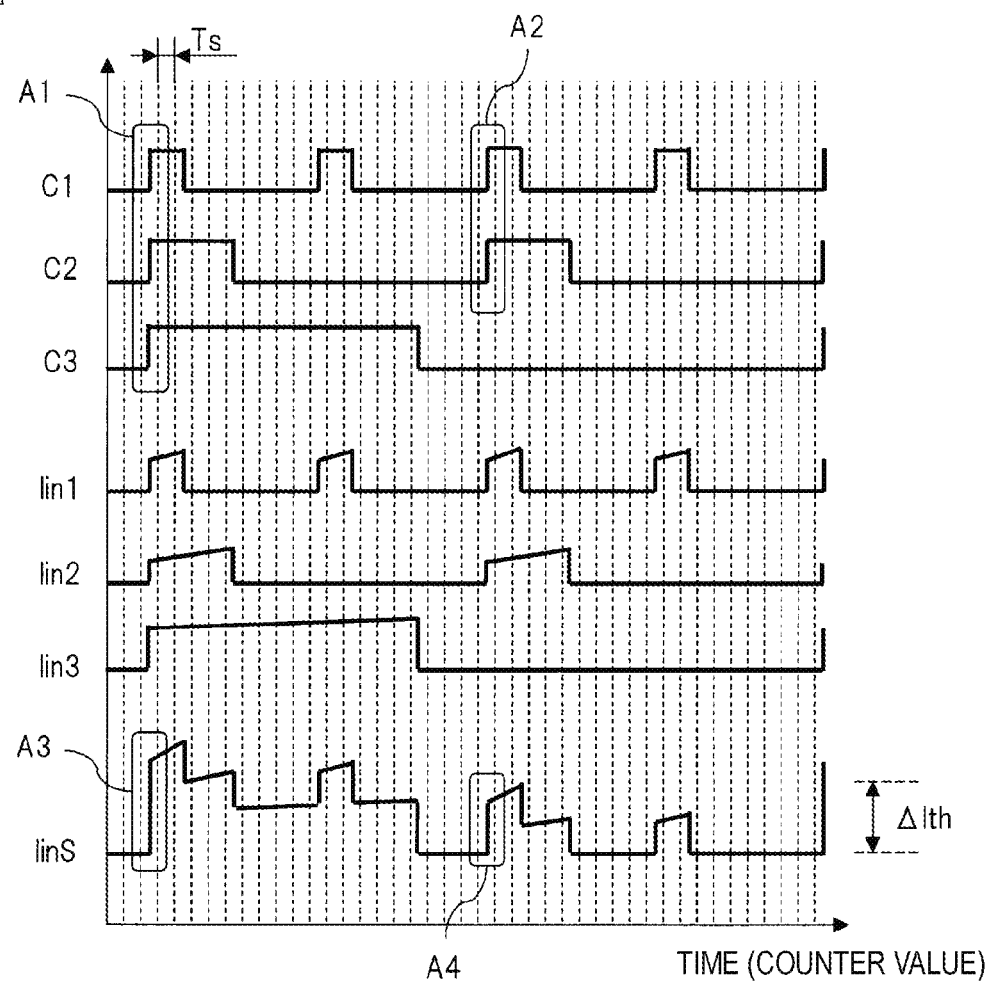
[FIG. 9]

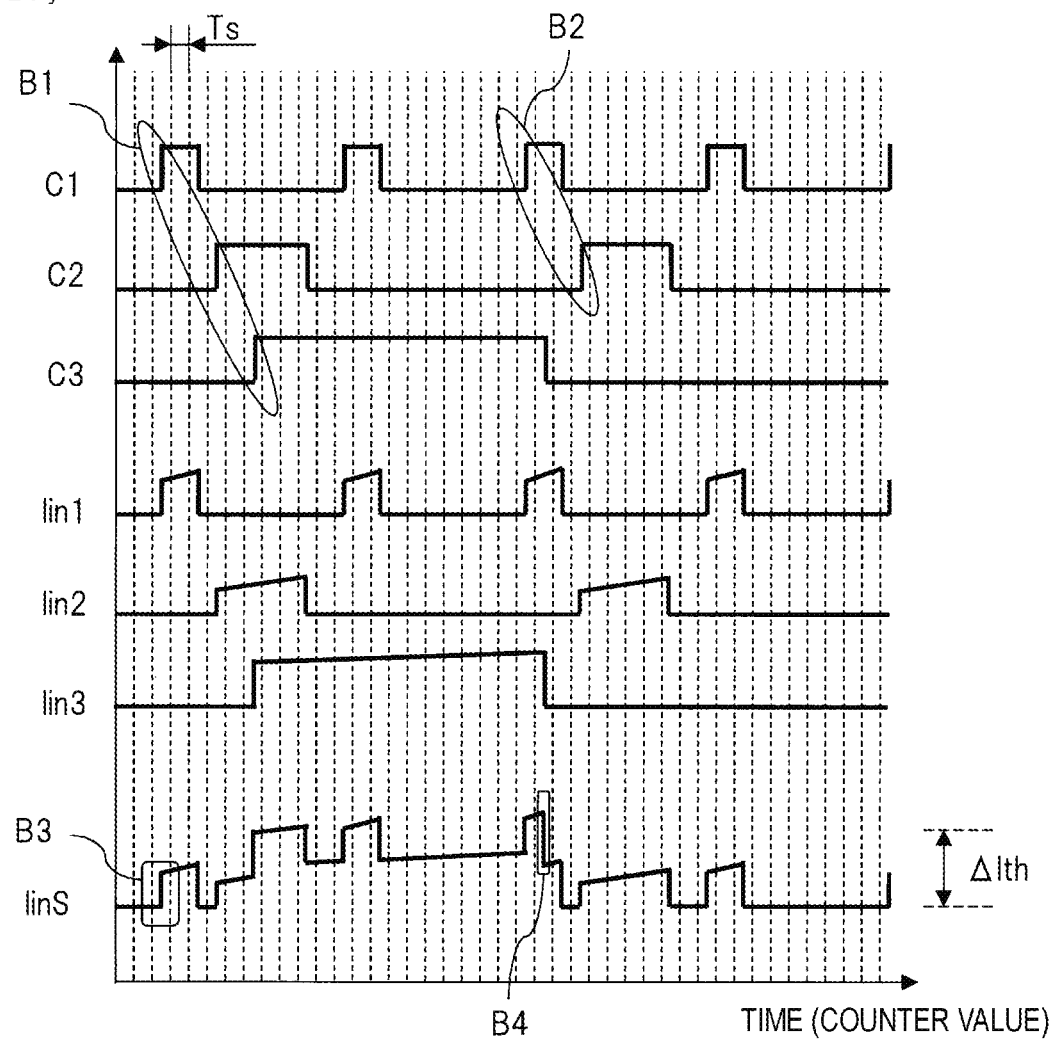
[FIG. 10]

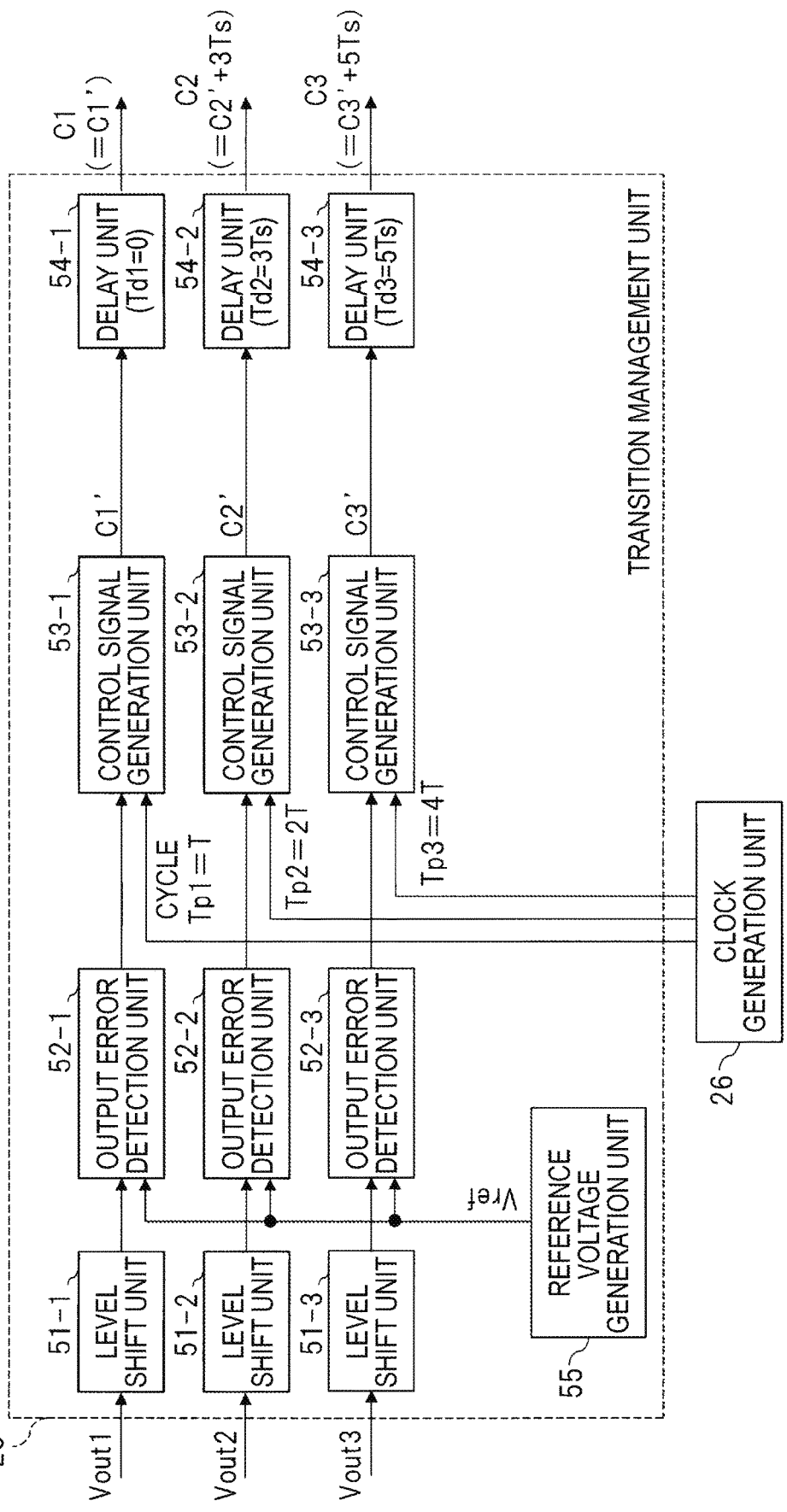

[FIG. 12]
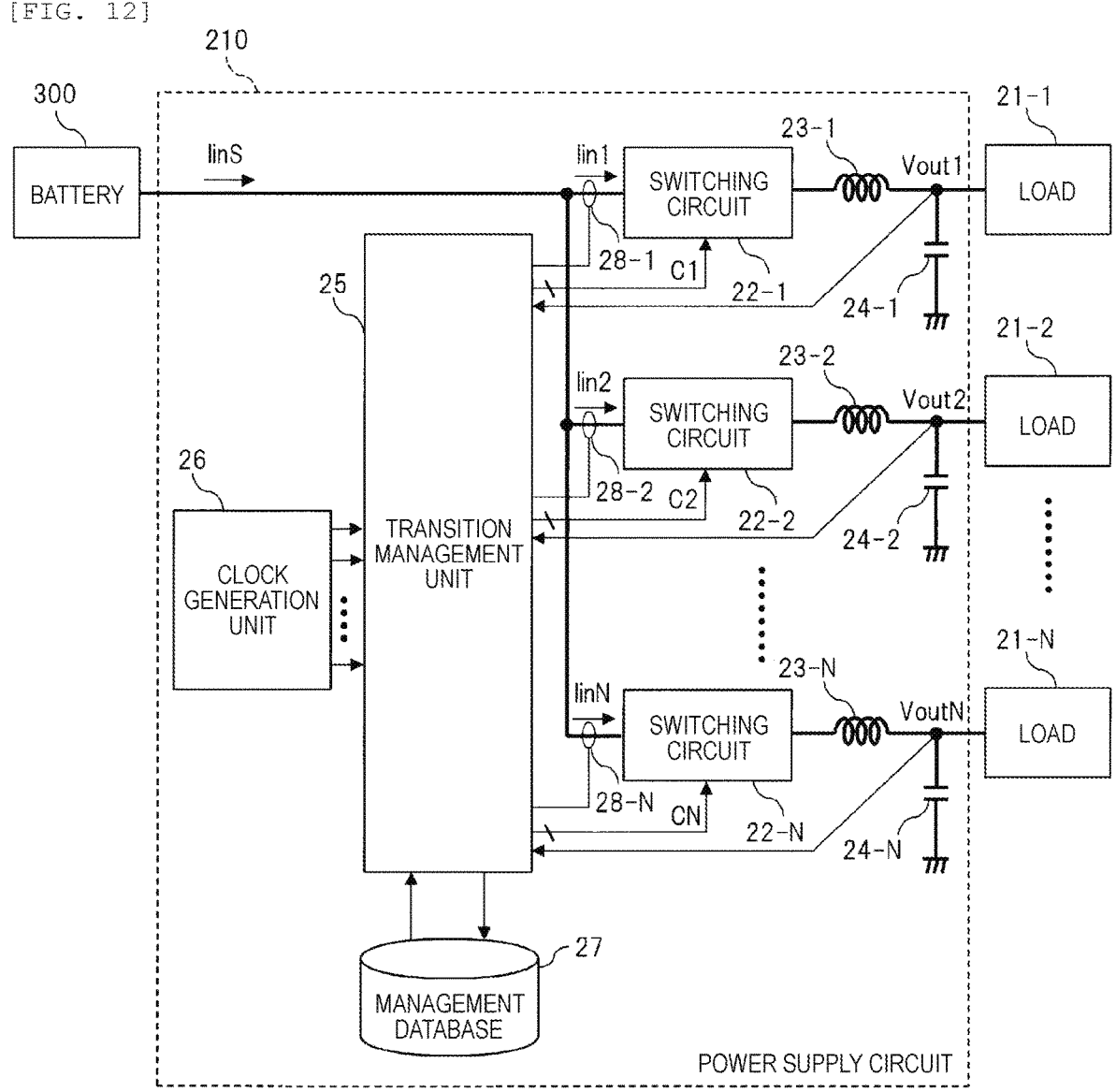

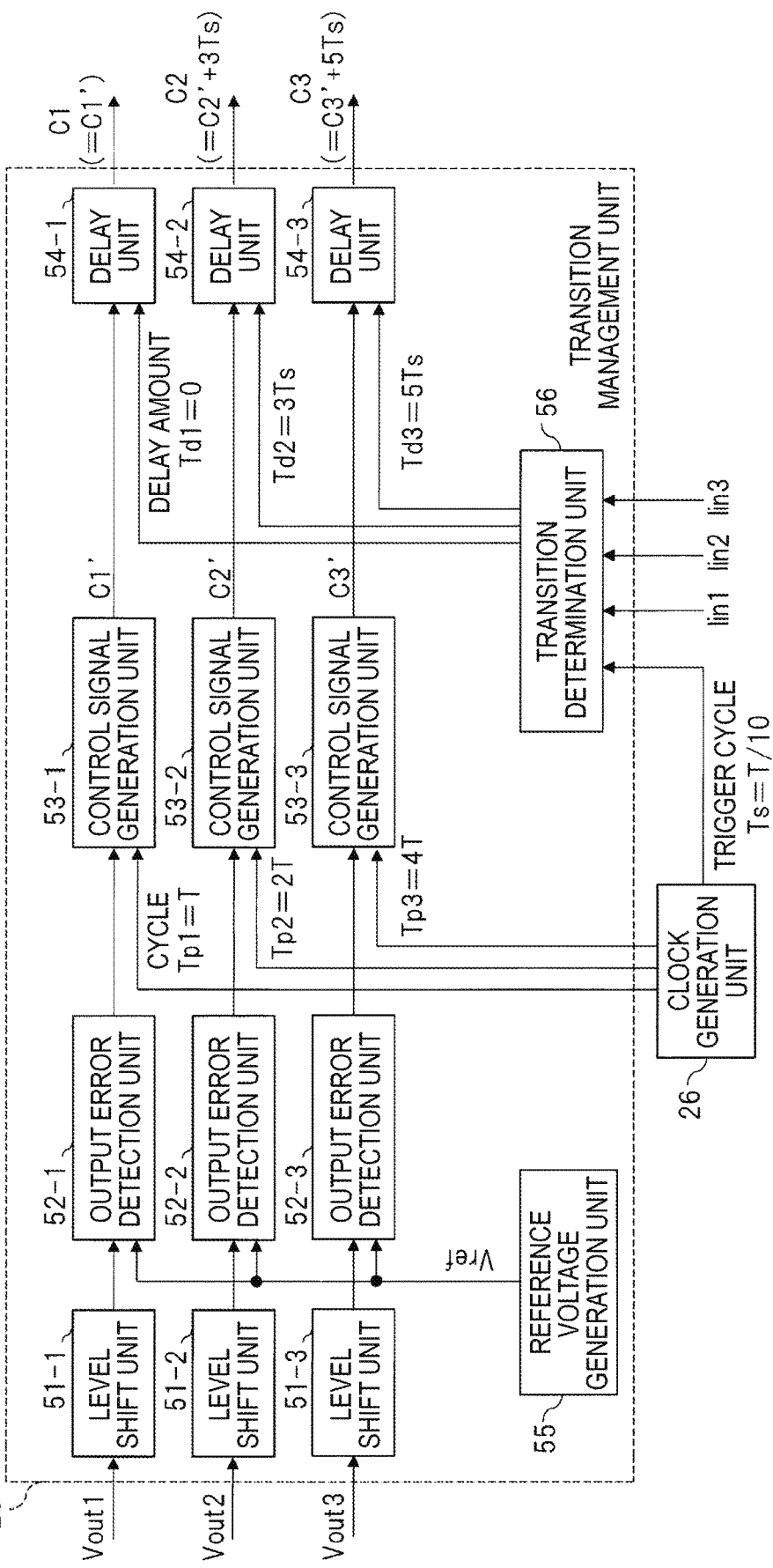
[FIG. 13]

ELECTRONIC CONTROL DEVICE, IN-VEHICLE SYSTEM, AND POWER SUPPLY DEVICE

TECHNICAL FIELD

The present invention relates to an electronic control device, an in-vehicle system, and a power supply device, and more particularly, to a technique effective for controlling a power supply that supplies power to a plurality of logic circuits.

BACKGROUND ART

Automatic driving systems need to detect vehicles, pedestrians, white lines, and the like based on signals input from sensors such as cameras, radar, or the like, to transmit the detected information to the driver or control braking and steering, and it is required to process advanced recognition algorithms and multiple algorithms simultaneously.

In order to respond to these requirements, studies are underway to improve the performance of an electronic control device using a semiconductor device such as a System on Chip (SoC). The SoC includes various logic circuits such as a Central Processing Unit (CPU) integrated into one chip.

The logic circuits embedded in the SoC have their own voltages, load currents, noises, sequences, and transient response requirements, respectively. In particular, the voltage requirements are diverse. In order to cope with this multi-channel integration, the power supply circuit is often designed to meet the requirements of each logic circuit by including multiple switching circuits in parallel.

The power supply circuit configured by the switching circuits generates noise due to the switching operations. Since the power supply circuit in the electronic control device is connected to the vehicle-mounted battery to receive power supply, the noise of the power supply circuit may be conducted to other vehicle-mounted devices connected to the same vehicle-mounted battery, thereby causing malfunction and failure.

As a technique for reducing such conducted noise, for example, insertion of a large-capacity capacitor into an input portion of a power supply circuit is widely known. Alternatively, it is common to provide a noise suppression component such as a snubber circuit or a noise filter.

As another noise reduction method, there is a method of reducing a noise level by spreading a spectrum of switching noise (for example, see JP-A-2016-054581 (PTL 1)). The technology disclosed in PTL 1 includes a frequency changing device that repeatedly outputs a frequency change pattern including a plurality of frequency values for performing switching control in a single output power supply circuit including a plurality of switching circuits in parallel.

Then, the switching elements are turned on and off at a switching frequency based on the frequency change pattern output from the frequency changing device, and when the spectrum of the switching noise of each switching element is superimposed, the switching frequency parameter of each element is changed.

CITATION LIST

Patent Literature

PTL 1: JP-A-2016-054581

SUMMARY OF INVENTION

Technical Problem

In a multi-channel power supply circuit provided with a plurality of switching circuits in parallel, when switching control is performed at the same and constant switching frequency for each switching circuit, large conducted noise due to the same frequency may occur. As a result, there is a problem that the multi-channel power supply circuit may act as a noise generation source, which may cause other electronic devices to malfunction or stop functioning.

There is a concern that the addition of a large-capacity capacitor or the addition of a snubber circuit or a noise filter described above, which is a technique for suppressing conducted noise, may increase the cost and increase the mounting area.

Further, when the multi-channel power supply circuit is applied with PTL 1 described above, it is necessary to continuously change the frequency of an oscillator that outputs a switching control signal to change the switching frequency parameter of each switching element. Therefore, the frequency range is inevitably limited, and it is considered that the effect of reducing the noise level cannot be sufficiently obtained in an electronic control device for an automatic driving system which requires a large number of power supply channels.

As described above, each output of the multi-channel power supply circuit is designed according to the requirements of each connected logic circuit. Since the switching frequency is a parameter that greatly affects the requirements of power efficiency and the responsiveness, the frequency range is further limited.

An object of the present invention is to provide a technique capable of reducing, at low cost, conducted noise of an input current in a power supply circuit including a plurality of channels.

The above and other objects and novel features of the present invention will be apparent from the description of the present specification and the accompanying drawings.

Solution to Problem

The following explains briefly the outline of a representative example of the inventions disclosed in the present application.

That is, a representative electronic control device includes a plurality of logic circuits and a power supply device that supplies power to the plurality of logic circuits. The power supply device includes a plurality of switching circuits, a transition management unit, and a clock generation unit.

The switching circuits generate and output power supplies to be supplied to the plurality of logic circuits based on the switching signal, respectively. The transition management unit controls the plurality of switching circuits. The clock generation unit generates a plurality of clock signals.

The transition management unit includes a control signal generation unit and a plurality of delay units. The control signal generation unit generates an intermediate control signal from the clock signal generated by the clock generation unit. The delay unit is provided to correspond to each of the plurality of switching circuits, to delay the intermediate control signal based on a command signal, and outputs the delayed intermediate control signal as the switching signal.

Further, the plurality of clock signals generated by the clock generation unit includes at least one clock signal having a different frequency.

In particular, the transition management unit includes a transition determination unit that generates the command signal based on control information set in advance. The transition determination unit calculates a total value of change amounts of input currents of the plurality of switching circuits based on the command signal, and compares the calculated total value with a preset current variation threshold value to control a delay amount in the delay unit such that the compared total value is equal to or less than the current variation threshold value.

Advantageous Effects of Invention

The effect obtained by a representative example of the inventions disclosed in the present application will be briefly described as follows.

A highly reliable electronic control device can be provided at low cost.

BRIEF DESCRIPTION OF DRAWINGS

FIG. 1 is a block diagram illustrating an example of a configuration of an in-vehicle system according to a first embodiment.

FIG. 2 is a block diagram illustrating an example of a configuration of an autonomous running control ECU included in the in-vehicle system of FIG. 1.

FIG. 3 is an explanatory diagram illustrating an example of a configuration of a power supply circuit included in the autonomous running control ECU in FIG. 2.

FIG. 4 is an explanatory diagram illustrating an example of a circuit in the switching circuit of FIG. 3.

FIG. 5 is an explanatory diagram illustrating another example of the circuit of the switching circuit of FIG. 4.

FIG. 6 is a block diagram illustrating an example of a transition management unit included in the power supply circuit of FIG. 3.

FIG. 7 is a flowchart illustrating an example of transition determination processing executed by the transition management unit of FIG. 6.

FIG. 8 is an explanatory diagram illustrating an example of a data configuration in a management database included in the power supply circuit of FIG. 3.

FIG. 9 is a schematic diagram illustrating an example of each signal waveform in the power supply circuit studied by the present inventor.

FIG. 10 is a schematic diagram illustrating an example of each signal waveform in the power supply circuit included in the transition management unit illustrated in FIG. 6.

FIG. 11 is an explanatory diagram illustrating an example of a configuration of a transition management unit 5 according to a second embodiment.

FIG. 12 is a block diagram illustrating an example of a configuration of a power supply circuit according to a third embodiment.

FIG. 13 is an explanatory diagram illustrating an example of a configuration of a transition management unit included in the power supply circuit of FIG. 12.

DESCRIPTION OF EMBODIMENTS

Throughout the drawings for describing the embodiments, the same members are denoted by the same reference numerals in principle, and the description thereof will not be repeated.

Hereinafter, embodiments will be described in detail.

First Embodiment

<Configuration Example of in-Vehicle System>

FIG. 1 is a block diagram illustrating an example of the configuration of an in-vehicle system 10 according to a first embodiment.

The in-vehicle system 10 is a system that controls autonomous running of a vehicle, for example. As illustrated in FIG. 1, the in-vehicle system 10 includes a camera 101, radar 102, a vehicle position sensor 103, an automatic driving button 104, a wireless communication unit 105, an auxiliary control Electronic Control Unit (ECU) 106, a brake control ECU, an engine control ECU 108, a power steering control ECU 109, and an autonomous running control ECU 201.

The camera 101, the radar 102, and the vehicle position sensor 103 are external environment recognition sensors that recognize the external environment of the vehicle. The camera 101 and the radar 102 are sensors for recognizing the external environment and obtaining a distance to an object.

The vehicle position sensor 103 is a sensor that detects the position of the vehicle using a Global Positioning System (GPS) or the like. The automatic driving button 104 is a button for starting automatic driving control or changing the automatic driving mode. The wireless communication unit 105, which is a communication device, is connected to a wireless network (not illustrated) for updating an in-vehicle system by Over-The-Air (OTA) method, for example.

The autonomous running control ECU 201, which is an electronic control device and an autonomous running control device, is a vehicle-running control device for automatic driving. The auxiliary control ECU 106 is an auxiliary control device for controlling running of the automatic driving vehicle. The brake control ECU 107 is a control device that performs brake control on the vehicle, that is, performs control on the braking force.

The engine control ECU 108 is a control device that controls the engine generating the driving force of the vehicle. The power steering control ECU 109 is a control device that controls the power steering of the vehicle.

The camera 101, the radar 102, the vehicle position sensor 103, the automatic driving button 104, and the wireless communication unit 105 are connected to the autonomous running control ECU 201, respectively. The autonomous running control ECU 201 receives update information and the like including the sensor information from the camera 101, the radar 102, and the vehicle position sensor 103, automatic driving control signals from the automatic driving button 104, and autonomous running control processing information from the wireless communication unit 105.

The autonomous running control ECU 201, the auxiliary control ECU 106, the brake control ECU 107, the engine control ECU 108, and the power steering control ECU 109 are communicably connected to each other by a Controller Area Network (CAN), for example.

When receiving a request to start automatic driving from the automatic driving button 104, the autonomous running control ECU 201 calculates a moving route of the vehicle based on information on the external environment received from the camera 101, the radar 102, the vehicle position sensor 103, and the like.

Further, the autonomous running control ECU 201 outputs commands for controlling a brake, a driving force, and the like to the brake control ECU 107, the engine control ECU 108, and the power steering control ECU 109 to move the vehicle along the route described above.

The brake control ECU 107, the engine control ECU 108, and the power steering control ECU 109 receive control commands for autonomous running control from the autonomous running control ECU 201 and output operation signals to control targets such as actuators.

That is, the autonomous running control ECU 201 is a main control device that outputs a control command, and the brake control ECU 107, the engine control ECU 108, and the power steering control ECU 109 are sub-control devices that control the control targets according to the control command output from the autonomous running control ECU 201.

The auxiliary control ECU 106 is an auxiliary control device for performing automatic driving control instead of the autonomous running control ECU 201 when the autonomous running control ECU 201 is in an abnormal state.

<Regarding Autonomous Running Control ECU>

FIG. 2 is a block diagram illustrating an example of a configuration of the autonomous running control ECU 201 included in the in-vehicle system 10 of FIG. 1.

The autonomous running control ECU 201 includes a power supply circuit 210 and a plurality of SoCs 211 as illustrated in FIG. 2. The power supply circuit 210, which is a power supply device, supplies power to the plurality of SoCs 211. In other words, the power is supplied to the plurality of SoCs 211.

Each of the SoC 211 includes a CPU 212, a GPU 213, and an FPGA 214. The CPU 212 includes a core logic 215 which is a core logic circuit, and an input and output circuit 216 which is a logic circuit.

Likewise, the GPU 213 includes a core logic 217 which is a core logic circuit, and an input and output circuit 218, and the FPGA 214 includes a core logic 219 which is a core logic circuit, and an input and output circuit 220. These core logics 215, 217, and 219 and input and output circuits 216, 218, and 220 are formed of logic circuits.

Here, a memory, a communication device, and the like are not described to simplify the description. These core logics 215, 217, and 219 execute operations of respective algorithms of recognition, prediction, and control on automatic driving.

The input and output circuits 216, 218, and 220 perform exchange of information among the respective core logics 215, 217, and 219, and the like. Since the operation loads performed by the core logics 215, 217, and 219 and the communication frequencies of each of the input and output circuits 216, 218, and 220 are different from each other, there are various requirements for the power supply supplied thereto.

The multi-channel power supply circuit 210 converts and supplies the power supplied from the battery 300 to meet the requirements for the power of the core logics 215, 217, and 219 and the input and output circuits 216, 218, and 220, respectively.

In FIG. 2, although an example in which one battery 300 and one power supply circuit 210 are used has been described, each may have a redundant configuration in the viewpoint of a fail operation. Specifically, the power may be supplied individually to a plurality of redundant SoCs using separate power supply circuits and separate batteries.

Further, the number of SoCs described above and the configuration of the logic circuit therein are merely examples. These are dependent on the calculation scale in the autonomous running control ECU 201. For example, as the level of the automatic driving covered by the autonomous running control ECU 201 increases, the number of SoCs increases, and the configuration of the logic circuit therein, that is, the core logic becomes more complicated.

<Configuration Example of Power Supply Circuit>

FIG. 3 is an explanatory diagram illustrating an example of a configuration of the power supply circuit 210 included in the autonomous running control ECU 201 in FIG. 2.

The power supply circuit 210 supplies the power supplied from the battery 300 to loads 21-1 to 21-N, respectively. Here, the loads 21-1 to 21-N correspond to the core logics 215, 217, and 219 and the input and output circuits 216, 218, and 220 of FIG. 2. Hereinafter, when being collectively referred to, the loads 21-1 to 21-N are simply referred to as the load 21.

The power supply circuit 210 includes switching circuits 22-1 to 22-N, coils 23-1 to 23-N, capacitors 24-1 to 24-N, a transition management unit 25, a clock generation unit 26, and a management database 27.

Hereinafter, when being collectively referred to, the switching circuits 22-1 to 22-N are simply referred to as the switching circuit 22, and when being collectively referred to, the coils 23-1 to 23-N are simply referred to as the coil 23. Further, when being collectively referred to, the capacitors 24-1 to 24-N are simply referred to as the capacitor 24.

In this example, a description will be given of a step-down switching circuit in which the switching circuit 22 uses a Pulse Width Modulation (PWM) control method, as an example.

The clock generation unit 26 generates a clock signal. This clock signal is a base of a control signal for switching ON and OFF of a switch included in the switching circuit 22. The frequency of the clock signal may be referred to as a switching frequency, and characteristics such as power efficiency and responsiveness of the switching circuit 22 depend on the switching frequency.

As described above, since the required values for these characteristics differ for each load 21, the clock generation unit 26 generates a plurality of different frequencies. With reference to these clock signals and the observed output voltages Vout1, Vout2, . . . , VoutN to each load 21, the transition management unit 25 generates control signals C1, C2, . . . , CN to be transmitted to each switching circuit 22 based on the control information stored in the management database 27. These control signals C1, C2, . . . , CN are switching signals.

Here, when being collectively referred to, the output voltages Vout1, Vout2, . . . , VoutN to the loads are simply referred to as the output voltage Vout. In addition, when being collectively referred to, the control signals C1, C2, . . . , CN to be transmitted to the switching circuits are simply referred to as the control signal C.

The control signal C may be a 1-bit signal of 1 (high) or 0 (low), and is a signal for turning ON and OFF the switch, respectively. Details of the transition management unit 25 and the management database 27 will be described below.

The switching circuit 22 increases and decreases the inductor current flowing through the coil 23 by turning ON and OFF an internal switch according to the control signal C described above. Since the output voltage generated by the output current flowing through the load 21 has a large ripple due to the variations in the inductor current, the output voltage is smoothed by connecting the capacitor 24 to a voltage close to DC.

Here, the input currents Iin1 to IinN are input currents to the switching circuits 22-1 to 22-N, and when being collectively referred to, the input currents Iin1 to IinN are simply referred to as the input current Iin.

The input current Iin and the input current IinS that is the input current of the power supply circuit 210 have the following relationship.

[Equation 1]

$$I_{in1} = \sum_{K=1}^{N} I_{inK}$$

(Equation 1)

Accordingly, the conducted noise included in the input current Iin of the switching circuit 22 is added in the same manner, and thus, it may also be seen from this equation that the sum is flowed to other electronic devices connected to the battery 300.

<Configuration Example of Switching Circuit>

FIG. 4 is an explanatory diagram illustrating an example of a circuit in the switching circuit 22 of FIG. 3. FIG. 5 is an explanatory diagram illustrating another example of the circuit of the switching circuit 22 of FIG. 4.

Both FIGS. 4 and 5 illustrate an example of a step-down switching circuit. The step-down switching circuit time-divides a direct-current input voltage by a switch and then smooths the divided voltage by a coil and a capacitor (not illustrated) to obtain a desired direct-current (DC) output voltage.

The switching circuit 22 illustrated in FIG. 4 is a synchronous step-down switching circuit, and includes switches 41 and 43. These switches 41 and 43 are turned ON and OFF by control signals C1H and C1L, respectively. The control signals C1H and C1L are output from the transition management unit 25 in FIG. 3, for example. Ideally, the ON and OFF states of the switches 41 and 43 are reversed to each other.

The switching circuit 22 illustrated in FIG. 5 illustrates an example of an asynchronous step-down switching circuit, and includes a switch 41 and a diode 42. While there is a difference from the synchronous switching circuit illustrated in FIG. 4 in that a switch connected to the ground, which is a reference potential, is replaced by the diode 42, the basic operation is the same as each other. In the switching circuit 22, the switch 41 is turned ON and OFF by a control signal C1. The control signal C1 is output from the transition management unit 25 in FIG. 3, for example.

Hereinafter, the configuration of the switching circuit 22 will be described by assuming that it is an asynchronous step-down switching circuit of FIG. 5. When the synchronous step-down switching circuit illustrated in FIG. 4 is used, since two control signals C1H and C1L are required as described above, either one of the control signals needs to be added. The control signal to be added may be generated by inverting the original control signal in consideration of the dead time.

<Configuration Example of Transition Management Unit>

FIG. 6 is a block diagram illustrating an example of the transition management unit 25 included in the power supply circuit 210 of FIG. 3.

Here, for simplicity of description, it will be described that the transition management unit 25 is for three power supply channels.

As illustrated in FIG. 6, the transition management unit 25 includes level shift units 51-1 to 51-3, output error detection units 52-1 to 52-3, control signal generation units 53-1 to 53-3, delay units 54-1 to 54-3, a reference voltage generation unit 55, and a transition determination unit 56.

Hereinafter, when being collectively referred to, the level shift units 51-1 to 51-3 are referred to as the level shift unit 51, and when being collectively referred to, the output error detection units 52-1 to 52-3 are referred to as the output error detection unit 52. In addition, when being collectively referred to, the control signal generation units 53-1 to 53-3 are referred to as the control signal generation unit 53, and when being collectively referred to, the delay units 54-1 to 54-3 are referred to as the delay unit 54.

Further, an output voltage correction unit is configured by the level shift unit 51, the output error detection unit 52, the control signal generation unit 53, and the reference voltage generation unit 55.

The level shift unit 51 converts the output voltage Vout to be transmitted to the load so that the output voltage Vout is compatible with a reference voltage Vref. The level shift unit 51 outputs the converted voltage to the output error detection unit 52. The reference voltage generation unit 55 generates the reference voltage Vref.

The output error detection unit 52 outputs a difference between the voltage output from the level shift unit 51 and the reference voltage Vref generated by the reference voltage generation unit 55. The control signal generation unit 53 generates an intermediate control signal C' from the triangular wave input from the clock generation unit 26 and the difference output from the output error detection unit 52. The intermediate control signal C' is a PWM signal. The intermediate control signals output from the control signal generation units 53-1, 53-2, and 53-3 are intermediate control signals C1', C2', and C3', respectively.

The intermediate control signal C' may be a 1-bit signal of 1 (high) or 0 (low), and is a signal for turning ON and OFF the switch, respectively. Here, as an example, the periods Tp1, Tp2, and Tp3 of the triangular waves input from the clock generation unit 26 to the control signal generation units 53-1, 53-2, and 53-3 are set to times T, 2T, and 4T, respectively.

When the switching frequency, which is the reciprocal of these, increases, the switching loss increases and the power supply efficiency decreases, but the responsiveness to load variation increases, and when the switching frequency decreases, the reverse is the case. For example, in the above description, the power supply channel with Tp1=T may be considered for CPU with a relatively small current consumption but a relatively high operating frequency, and large load variations.

The power supply channel with Tp3=4T may be considered for FPGA with a relatively large current consumption, a relatively low operating frequency, and small load variations. The power supply channel with Tp2=2T may be considered for GPU that is in between of these.

Using a timing signal output from the clock generation unit 26, that is, using cycle Ts=T/10 as a trigger, the transition determination unit 56 samples the intermediate control signal C'. This timing signal is a measurement timing signal.

Then, a desired delay amount for each power supply channel is derived by performing arithmetic processing using each sampled signal, and a command signal is sent to the delay unit 54. The details of the transition determination by the transition determination unit 56 will be described below.

In this example, the description will continue with reference to an example where, as a result of the arithmetic processing of the transition determination unit 56, the command signals for the delay amount to be sent to the delay units 54-1, 54-2, and 54-3 are Td1=0, Td2=3Ts, and Td3=5Ts, respectively.

The delay unit 54 receives the command signal for the delay amount output from the transition determination unit 56, and delays the intermediate control signal C' accordingly. As a result, the delay units 54-1, 54-2, and 54-3 output the control signals C1 (=C1'), C2 (=C2'+3Ts), and C3 (=C3'+5Ts).

<Regarding Transition Determination Processing>

FIG. 7 is a flowchart illustrating an example of the transition determination processing executed by the transition management unit 25 of FIG. 6.

The transition determination processing reduces the current ripple of the input current IinS of the power supply circuit 210. In this example, an example in which the transition management unit 25 detects an instantaneous value of the conducted noise will be described. In addition, as in FIG. 5, for simplicity of description, it will be described that the transition management unit 25 is for three power supply channels.

First, upon starting the transition determination processing, the transition management unit 25 updates the internal counter value t of the transition management unit 25 to 0, and reads the control information of the set operation mode from the management database 27 (Step S101). Details of the management database 27 will be described below.

Subsequently, the processing waits until a timing signal output from the clock generation unit 26 is received (step S102). Then, when the timing signal is received, the counter value t is incremented, and C1'(t), C2'(t), and C3'(t) are obtained by sampling the intermediate control signals C1', C2', and C3' of each power supply channel according to the timing signal (step S103).

Thereafter, based on these sampled values, currents Iin1(t), Iin2(t), and Iin3(t), which are the sampled values of the input currents of the switching circuits 22-1, 22-2, and 22-3, an input current IinS(t) of the power supply circuit, and a change amount per time ΔIin1(t), ΔIin2(t), ΔIin3(t), and ΔIinS(t) are calculated according to Equations 2 to 5 below (step S104).

Here, ImN is a current coefficient which is one of the control information read from the management database 27.

[Equation 2]

$$I_{inN}(t) = I_{inN} C'_N(t) \quad \text{(Equation 2)}$$

[Equation 3]

$$I_{inS}(t) = \sum_{K=1}^{N} I_{inS}(t) \quad \text{(Equation 3)}$$

[Equation 4]

$$I_{inN}(t) = \frac{I_{inN}(t) - I_{inN}(t-1)}{T_s} \quad \text{(Equation 4)}$$

[Equation 5]

$$I_{inS}(t) = \frac{I_{inS}(t) - I_{inS}(t-1)}{T_s} \quad \text{(Equation 5)}$$

It is determined whether the absolute value of the change amount ΔIinS(t) per time of the input current of the power supply circuit 210 is greater than a current variation threshold value ΔIth which is one of the control information read from the management database 27 (step S105).

When the absolute value is below the threshold value, the processing proceeds to step S109 which will be described below, and when the absolute value is above the threshold value, the processing in step S106 is performed such that |ΔIinS(t)| is less than ΔIth.

Specifically, ΔIinN(t) of the power supply channel having the higher priority is subtracted from ΔIinS(t) based on the priority information which is one of the control information read from the management database 27.

Then, ΔIinS(t) is replaced by the subtraction result, and the subtraction is repeated in the same manner until the following equation is satisfied (step S106). In this example, the subtraction is performed according to the priority order, but the subtraction may be performed in order of the power supply channel with a larger |ΔIinN(t)|.

[Equation 6]

$$|\Delta I_{int}(t)| < \Delta I_{sk} \quad \text{(Equation 6)}$$

Then, before subtraction is performed with respect to all power supply channels, it is determined whether Equation 6 described above is satisfied (step S107), and when the equation is not satisfied, a warning is output to a host system such as an ECU that manages the power supply (step S110). Thus, the processing is ended.

On the other hand, when the equation is satisfied, a command signal is sent to the delay unit 54 to delay the power supply channel on which the subtraction was performed, by the delay amount TdN, which is one of the control information read from the management database 27 (step S108).

Finally, during this series of processing flows, it is confirmed whether there is a command to switch an operation mode from the host system (step S109). If there is the switching command, the present processing is ended, and if there is no switching command, the processing returns to step S102 to continue the processing.

In this example, although an example in which the instantaneous value of the conducted noise is detected has been described, the similar method can also be applied even when the time average value is detected. For example, ΔIinN(t) and ΔIinS(t) described above may be replaced with a time average value up to a counter value t where the number of samples is constant.

<Configuration Example of Management Database>

FIG. 8 is an explanatory diagram illustrating an example of a data configuration in the management database 27 included in the power supply circuit 210 of FIG. 3.

In the management database 27, an operation mode 72 is associated with control information 73-1 to 73-6, which are parameters for the transition determination processing of the mode. Here, when being collectively referred to, the control information 73-1 to 73-6 is simply referred to as the control information 73. The management database 27 is referenced by the transition management unit 25.

Here, the operation mode 72 illustrates an application example in the automatic driving, and includes a mode A which is a city running mode, a mode B which is a highway running mode, a mode C which is a parking mode, and a mode D of when an abnormality of the ECU is detected, for example.

In the control information 73 corresponding to these operation modes 72, the control information 73-1 is stored with the detection mode information of the conducted noise. In this case, the control information 73-1 is set such that instantaneous value detection and average value detection are executed during normal operation, that is, in modes A to C, while only the instantaneous value detection is executed in the mode of ECU abnormality, that is, in the event of emergency in mode D.

The control information 73-2 stores information of a time span Ts for sampling the intermediate control information C', for example. According to the operation mode, the time span may be set shorter to perform the detection with higher accuracy, or the time span may be set longer to perform the arithmetic processing with a lower delay.

When the time span is variable, it may be controlled such that a command signal is output to the clock generation unit 26 to generate a clock corresponding to the time span. Alternatively, the clock generation unit 26 may generate a short-period timing signal in advance, and the transition determination unit 56 may selectively use the timing signals as appropriate.

The control information 73-3 is stored with information on the current variation threshold value $\Delta$Ith. At the time of instantaneous value detection and average value detection, the current variation threshold value may be separately set as $\Delta$Ithpk and $\Delta$Ithav, respectively. These numerical values are set by referencing the standard values of the conducted noise, for example.

The control information 73-4 is stored with information of current coefficients Im1 to ImN for calculating the input current of each switching circuit 22. The current coefficients Im1 to ImN are set based on a maximum current flowing through a load connected to each switching circuit 22 which is derived in advance by simulation or actual measurement, for example.

The control information 73-5 is stored with information on the delay amounts Td1 to TdN corresponding to each power supply channel. The transition management unit 25 determines the delay amount by which the delay unit 54 is to be delayed according to this information.

The control information 73-6 is stored with information on the priority of transition management of each power supply channel. In this example, the higher the priority, the higher the priority for delay. In other words, the power supply channel that supplies power to the core logic or the like that performs the highly reliable operation is set with a lower priority.

As described above, the transition determination processing may be changed according to the operation mode. The management database 27 may change and add the operation mode and control information of the automatic driving through the wireless network by OTA method from the server on the cloud, for example.

First, when an instruction to add the database is set at the server, the update data is transmitted to the wireless communication unit 105 of the in-vehicle system 10 in FIG. 1. The wireless communication unit 105 transmits the received update data to the transition management unit 25 of the autonomous running control ECU 201. Thus, the changing and adding processing of the operation mode and control information of the automatic driving is completed.

As a result, it is possible to flexibly reset the transition determination processing according to the calculation load required for the operation mode of the automatic driving, such as performance and delay. Furthermore, even when a new operation mode of automatic driving is added, the transition management information used in the added operation mode may be additionally introduced into the power supply circuit 210 without affecting the operation mode being used.

For example, the current variation threshold value $\Delta$Ith of the control information 73-3 may be set according to the surrounding environment of the vehicle or the arithmetic processing of the SoC 211 of FIG. 2. Specifically, in mode A which is a city running mode, when city running is performed, the current variation threshold value $\Delta$Ith is set according to the congestion state of the road, such as, for example, according to whether the traffic is congested or not. This may be similarly applied to the mode B which is the highway running mode. As a result, the control signal C may be generated more precisely, and the conducted noise of the input current may be accurately reduced.

<Effects>

The effects will then be described with reference to FIGS. 9 and 10.

FIG. 9 is a schematic diagram illustrating an example of each signal waveform in the power supply circuit studied by the present inventor.

FIG. 9 illustrates an example of a transition management unit having no function of delay control by the transition determination processing illustrated in FIG. 7 and the like, and illustrates, from top to bottom, the time-dependent waveforms of the control signals C1 to C3 output from the transition management unit, the input currents Iin1 to Iin3 to the switching circuit, and the input current IinS of the power supply circuit. The horizontal axis represents the timing signal described with reference to FIG. 7.

In this case, as described in FIG. 6, the periods Tp1, Tp2, and Tp3 of the control signals are T, 2T, and 4T, respectively, and the cycle Ts of the timing signal from the clock generation unit 26 is T/10.

By the control signals C1 to C3, the input current to the switching circuit illustrates a behavior of Iin1 to Iin3, and the sum input current waveform to the power supply circuit is varied as IinS.

Here, at point A1 (t=2 to 3) illustrated in FIG. 9, the control signals C1, C2, and C3 rise from low to high at the same time, and as a result, IinS has $\Delta$IinS(3) at point A3, which is greater than the current variation threshold value $\Delta$Ith set with reference to the standard value for the conducted noise.

In addition, at point A2 in FIG. 9, it can also be seen that the control signal C1 and the control signal C2 rise at the same time. From this, the conducted noise generated at point A4 is smaller than noise generated at point A3, and accordingly, the highest priority is to reduce the conducted noise at point A3.

FIG. 10 is a schematic diagram illustrating an example of each signal waveform in the power supply circuit 210 included in the transition management unit 25 illustrated in FIG. 6.

Likewise, FIG. 10 illustrates, from the top to the bottom, the time-dependent waveforms of the control signals C1 to C3 output from the transition management unit 25, the input currents Iin1 to Iin3 to the switching circuit 22, and the input current IinS of the power supply circuit 210. The horizontal axis represents the timing signal described with reference to FIG. 7.

In this case, the control signals C2 and C3 are delayed by 3Ts and 5Ts, respectively, as compared with those in FIG. 9 such that $\Delta$IinS(3) does not exceed the current variation threshold value $\Delta$Ith by the transition determination processing described in FIGS. 6, 7 and so on.

As a result, $\Delta$IinS(3) at point A3 in FIG. 9 is greatly reduced to below $\Delta$Ith as illustrated at point B3 in FIG. 10. Conversely, $\Delta$IinS at point B4 in FIG. 10 is greater than that at point B3, but falls within $\Delta$Ith.

In an example illustrated in the present embodiment, since the switching frequency of the third switching circuit is set to be an integral multiple of the switching frequency of the two switching circuits, performing the delay control once will suffice, and it is substantially not necessary to perform the subsequent delay controls. Further, in this example, while the switching frequencies of the three switching circuits are all different from each other, an effect similar to this embodiment can be obtained only by setting the switching frequency of only one switch circuit differently.

As described above, the delay amount of the control signal may be controlled based on the total value of the change amounts of the input currents of the plurality of switching circuits 22, so that the conducted noise of the input current can be effectively reduced even in a control device for automatic driving including a large number of power supply channels.

As a result, a highly reliable electronic control device, that is, the autonomous running control ECU 201 can be provided. Further, since a large-capacity input capacitor or the like is not required, the miniaturization and cost reduction for the autonomous running control ECU 201 can be realized.

Second Embodiment

In the first embodiment, the transition management unit 25 dynamically controls the delay of the control signal to reduce the conducted noise, but in the second embodiment, a technique for performing static control will be described.
<Configuration Example of Transition Management Unit>

FIG. 11 is an explanatory diagram illustrating an example of the configuration of the transition management unit 25 according to the second embodiment.

Hereinafter, the transition management unit 25, which is significantly different from the first embodiment, will be mainly described with reference to FIG. 11. In this example, for simplicity of description, it will be described that the transition management unit 25 performs transition determination processing for three power supply channels.

As illustrated in FIG. 11, the transition management unit 25 includes level shift units 51-1 to 51-3, output error detection units 52-1 to 52-3, control signal generation units 53-1 to 53-3, delay units 54-1 to 54-3 and a reference voltage generation unit 55. The transition management unit 25 of FIG. 11 is different from the transition management unit 25 of FIG. 6 according to the first embodiment in that the transition determination unit 56 is not provided.

Hereinafter, when being collectively referred to, the level shift units 51-1 to 51-3 are simply referred to as the level shift unit 51, and when being collectively referred to, the output error detection units 52-1 to 52-3 are simply referred to as the output error detection unit 52.

In addition, when being collectively referred to, the control signal generation units 53-1 to 53-3 are simply referred to as the control signal generation unit 53, and when being collectively referred to, the delay units 54-1 to 54-3 are simply referred to as the delay unit 54.

The level shift unit 51 converts the output voltage Vout to be transmitted to the load so that the output voltage Vout is compatible with a reference voltage Vref, and outputs the converted voltage to the output error detection unit 52 in the next stage. The output error detection unit 52 outputs a difference between the input voltage from the level shift unit 51 and the reference voltage Vref. The reference voltage generation unit 55 generates the reference voltage Vref.

The control signal generation unit 53 generates intermediate control signals C1', C2' and C3', which are PWM signals, from the triangular wave input from the clock generation unit 26 and the difference output from the output error detection unit 52.

Here, as an example, the periods Tp1, Tp2 and Tp3 of the triangular waves input from the clock generation unit 26 to the control signal generation units 53-1, 53-2, and 53-3 are T, 2T and 4T, respectively.

The delay unit 54 outputs the control signals C1, C2 and C3 obtained by delaying the intermediate control signals C1', C2' and C3' by the predetermined delay amounts Td1, Td2 and Td3. The delay amounts of the delay unit 54 are set in advance.

The delay amounts are derived and set by actually measuring, or simulating in advance the delay amount of each switching circuit that results in the conducted noise to fall within the allowable value when the switching frequency is determined as described above.

Since the delay amount of the delay unit 54 is fixed, the power supply circuit 210 does not need the management database 27. Accordingly, in this case, the power supply circuit 210 has a configuration obtained by removing the management database 27 from the configuration illustrated in FIG. 3 according to the first embodiment.

With this configuration, a current waveform similar to that of FIG. 10 according to the first embodiment can also be obtained. As a result, the conducted noise can be reduced. In this example, while the switching frequencies of the three switching circuits are all different from each other, for example, even when only one switching frequency is set differently from the others, the effect of favorably suppressing the conducted noise can be obtained.

As described above, since the management database 27 and the transition determination unit 56 can be omitted, the cost of the autonomous running control ECU 201 can be reduced.

Third Embodiment

In the first embodiment, the input current Iin of the switching circuit 22 is estimated from the intermediate control signal C, but in the third embodiment, a technique for directly measuring the input current Iin and controlling the conducted noise with high accuracy will be described.
<Configuration Example of Power Supply Circuit>

Hereinafter, a power supply circuit and a transition management unit different from the first embodiment will be mainly described with reference to FIGS. 12 and 13.

FIG. 12 is a block diagram illustrating an example of a configuration of a power supply circuit 210 according to the third embodiment.

The power supply circuit 210 of FIG. 12 differs from the power supply circuit 210 of FIG. 3 in that current sensors 28-1 to 28-N, which are current measurement units, are newly provided. When being collectively referred to, the current sensors 28-1 to 28-N are simply referred to as the current sensor 28.

The current sensors 28-1 to 28-N are provided at input portions of the switching circuits 22-1 to 22-N, respectively, and measure the input currents Iin1 to IinN.

The measurement results measured by these current sensors 28 are sent to the transition management unit 25 and used for transition determination processing described below. The current sensors 28 may use a current detection circuit using a current transformer, a Hall element, a Giant Magneto Resistive (GMR) effect element, and the like.

Further, when performing a more accurate current measurement, a current sensor for measuring the input current IinS of the power supply circuit 210 may be additionally installed.

<Configuration Example of Transition Management Unit>

FIG. 13 is an explanatory diagram illustrating an example of a configuration of the transition management unit 25 included in the power supply circuit 210 of FIG. 12.

Here, for simplicity of description, it will be described that the transition management unit 25 performs transition determination processing for three power supply channels.

The transition management unit 25 includes level shift units 51-1 to 51-3, output error detection units 52-1 to 52-3, control signal generation units 53-1 to 53-3, delay units 54-1 to 54-3, a reference voltage generation unit 55, and a transition determination unit 56.

The level shift unit 51 converts the output voltage Vout to be transmitted to the load so that the output voltage Vout is compatible with a reference voltage Vref generated by the reference voltage generation unit 55, and outputs the converted voltage to the output error detection unit 52 in the next stage.

The output error detection unit 52 outputs a difference between the voltage output from the level shift unit 51 and the reference voltage Vref. The control signal generation unit 53 generates intermediate control signals C1', C2' and C3', which are PWM signals, from the triangular wave input from the clock generation unit 26 and the difference output from the output error detection unit 52.

Here, as an example, the periods Tp1, Tp2 and Tp3 of the triangular waves input from the clock generation unit 26 to the control signal generation units 53-1, 53-2, and 53-3 are T, 2T and 4T, respectively.

Using a timing signal (cycle Ts=T/10) output from the clock generation unit 26 as a trigger, the transition determination unit 56 samples the input current Iin measured by the current sensor 28.

Then, a desired delay amount for each power supply channel is derived by performing arithmetic processing using these sampled values, and a command signal is sent to the delay unit 54. In this example, it is described that, as a result of the arithmetic processing of the transition determination unit 56, the command signals for the delay amounts to be sent to the delay units 54-1, 54-2, and 54-3 are Td1=0, Td2=3Ts, and Td3=5Ts, respectively.

The delay unit 54 receives the command for the delay amount output from the transition determination unit 56, and delays the intermediate control signal C' accordingly. As a result, the delay units 54-1, 54-2, and 54-3 output the control signals C1 (=C1'), C2 (=C2'+3Ts), and C3 (=C3'+5Ts).

Thus, the input current of the switching circuit 22 is measured by the current sensor 28, and the delay amount of the control signal is set in advance based on the total value of the change amounts, so that the conducted noise of the input current can be controlled with higher accuracy even in the electronic control unit including a large number of power supply channels, such as, the autonomous running control ECU 201.

Thereby, the highly reliable autonomous running control ECU 201 can be provided. In addition, since a large-capacity input capacitor or the like can be eliminated, the cost of the autonomous running control ECU 201 can be reduced, and miniaturization can be realized.

As described above, although the invention made by the inventor has been specifically described based on the embodiments, it is needless to say that the present invention is not limited to the embodiments described above, and can be variously modified without departing from the gist thereof.

It is to be noted that the present invention is not limited to the embodiments described above, and includes various modified examples. For example, the embodiments described above are described in detail to explain the present invention in an easy-to-understand manner, and are not necessarily limited to those having all the configurations described above.

Further, part of the configuration of an embodiment can be replaced with the configuration of another embodiment, and the configuration of another embodiment can be added to the configuration of an embodiment. In addition, it is possible to add, delete, and replace other configurations for a part of the configuration of each embodiment.

Each of the configurations, functions, processing units, processing means, and the like described above may be realized by hardware by designing part or all of those with, for example, an integrated circuit. Each of the configurations, functions, and the like described above may be realized by software by interpreting and executing a program that realizes each function by the processor. Information such as a program, a table, a file, and the like that realizes each function may be stored in a storage device such as a memory, a hard disk, a solid state drive (SSD), or a recording medium such as an IC card, an SD card, DVD.

Further, the illustrated control lines and information lines are those considered to be necessary for explanation, and it is not necessarily limited that all the control lines and information lines are illustrated necessarily on the product. In practice, it may be considered that almost all the components are connected to each other.

REFERENCE SIGNS LIST

10: in-vehicle system
21: load
22: switching circuit
23: coil
24: capacitor
25: transition management unit
26: clock generation unit
27: management database
28: current sensor
41: switch
42: diode
43: switch
51: level shift unit
52: output error detection unit
53: control signal generation unit
54: delay unit
55: reference voltage generation unit
56: transition determination unit
101: camera
102: radar
103: vehicle position sensor
104: automatic driving button
105: wireless communication unit
106: auxiliary control ECU
107: brake control ECU
108: engine control ECU
109: power steering control ECU
201: autonomous running control ECU
210: power supply circuit
215: core logic
216: input and output circuit 217: core logic
218: input and output circuit
219: core logic
220: input and output circuit
300: battery

The invention claimed is:

1. An electronic control device comprising a plurality of logic circuits and a power supply device for supplying power to the plurality of logic circuits, wherein
the power supply device includes
a plurality of switching circuits that respectively generate and output power to be supplied to the plurality of logic circuits based on a switching signal,
a transition management unit that controls the plurality of switching circuits, and
a clock generation unit that generates a plurality of clock signals,
the transition management unit includes
a control signal generation unit that generates an intermediate control signal from the clock signals generated by the clock generation unit, and
a plurality of delay units that are respectively provided corresponding to the plurality of switching circuits, to delay the intermediate control signal based on a command signal and to output the delayed intermediate control signal as the switching signal, and
the plurality of clock signals generated by the clock generation unit include at least one clock signal having a different frequency.

2. The electronic control device according to claim 1, wherein
the transition management unit includes a transition determination unit that generates the command signal based on control information set in advance, and
the transition determination unit calculates a total value of change amounts of input currents of the plurality of switching circuits based on the command signal, and compares the calculated total value with a preset current variation threshold value to control a delay amount in the delay unit such that the compared total value is equal to or less than the current variation threshold value.

3. The electronic control device according to claim 2, wherein the transition determination unit calculates the total value of the change amounts of the input currents of the plurality of switching circuits, from the intermediate control signal generated by the control signal generation unit.

4. The electronic control device according to claim 2, wherein
the power supply device includes a current measurement unit that measures an input current input to the plurality of switching circuits, and
the transition determination unit calculates the total value of the change amounts of the input currents, from the measurement result of the current measured by the current measurement unit.

5. The electronic control device according to claim 2, wherein the transition determination unit determines whether the input current rises or falls in synchronization with a measurement timing signal, and calculates the total value of the change amounts of the input currents from the determination result.

6. The electronic control device according to claim 2, wherein the current variation threshold value compared by the transition determination unit is varied for each operation mode of the electronic control device.

7. The in-vehicle system according to claim 2, wherein
the power supply device includes a management database that stores the control information,
the management database stores at least one of a current coefficient used when calculating the input current, a delay amount corresponding to each of the plurality of switching circuits, or a priority of the plurality of switching circuits to be delayed, and
the current coefficient, the delay amount, or the priority to be stored in the management database are set for each operation mode of the electronic control device.

8. The electronic control device according to claim 2,
wherein the transition management unit includes an output voltage correction unit that detects an error of each output voltage generated by the plurality of switching circuits, and corrects the intermediate control signal based on the detection result to reduce the error of the output voltage.

9. An in-vehicle system including an autonomous running control device that controls autonomous running of a vehicle, wherein
the autonomous running control device includes
a plurality of logic circuits, and
a power supply device for supplying power to the plurality of logic circuits,
the power supply device includes
a plurality of switching circuits that respectively generate and output power to be supplied to the plurality of logic circuits based on a switching signal,
a transition management unit that controls the plurality of switching circuits, and
a clock generation unit that generates a plurality of clock signals,
the transition management unit includes
a control signal generation unit that generates an intermediate control signal from the clock signals generated by the clock generation unit, and
a plurality of delay units that are respectively provided corresponding to the plurality of switching circuits, to delay the intermediate control signal based on a command signal and to output the delayed intermediate control signal as the switching signal, and
the plurality of clock signals generated by the clock generation unit include at least one clock signal having a different frequency.

10. The in-vehicle system according to claim 9, wherein
the transition management unit includes a transition determination unit that generates the command signal based on control information set in advance, and
the transition determination unit calculates a total value of change amounts of input currents of the plurality of switching circuits based on the command signal, and compares the calculated total value with a preset current variation threshold value to control a delay amount in the delay unit such that the compared total value is equal to or less than the current variation threshold value.

11. The in-vehicle system according to claim 10,
wherein the transition determination unit calculates the total value of the change amounts of the input currents of the plurality of switching circuits, from the intermediate control signal generated by the control signal generation unit.

12. The in-vehicle system according to claim 10, wherein
the power supply device includes a current measurement unit that measures an input current flowing through the plurality of switching circuits, and the transition determination unit calculates the total value of the change amounts of the input currents, from the measurement result of the current measured by the current measurement unit.

13. The in-vehicle system according to claim 10, wherein the current variation threshold value compared by the transition determination unit is varied for each operation mode of the autonomous running control device.

14. A power supply device comprising:

a plurality of switching circuits that respectively generate and output power to be supplied to a plurality of logic circuits based on a switching signal;

a transition management unit that controls the plurality of switching circuits; and a clock generation unit that generates a plurality of clock signals, wherein the transition management unit includes a control signal generation unit that generates an intermediate control signal from the clock signals generated by the clock generation unit, and a plurality of delay units that are respectively provided corresponding to the plurality of switching circuits, to delay the intermediate control signal based on a command signal and to output the delayed intermediate control signal as the switching signal, and the plurality of clock signals generated by the clock generation unit include at least one clock signal having a different frequency.

15. The power supply device according to claim 14, wherein the transition management unit includes a transition determination unit that generates the command signal based on control information set in advance, and the transition determination unit calculates a total value of change amounts of input currents of the plurality of switching circuits based on the command signal, and compares the calculated total value with a preset current variation threshold value to control a delay amount in the delay unit such that the compared total value is equal to or less than the current variation threshold value.

* * * * *